US008756204B2

(12) United States Patent
Cuneo et al.

(10) Patent No.: US 8,756,204 B2
(45) Date of Patent: Jun. 17, 2014

(54) ASYNCHRONOUS MULTI-LEVEL UNDO SUPPORT IN JAVASCRIPT GRID

(75) Inventors: Andrew R. Cuneo, Seattle, WA (US); Ben Worline, Duvall, WA (US); Eric M. Zenz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 11/971,206

(22) Filed: Jan. 8, 2008

(65) Prior Publication Data
US 2009/0177703 A1 Jul. 9, 2009

(51) Int. Cl.
*G06F 7/00* (2006.01)
*G06F 17/30* (2006.01)

(52) U.S. Cl.
CPC .............. *G06F 17/30368* (2013.01)
USPC ........... 707/684; 707/625; 707/690; 707/695; 707/683; 715/217; 715/255

(58) Field of Classification Search
CPC ................................................ G06F 17/30368
USPC .......... 707/625, 690, 695, 683, 684; 715/217, 715/255
See application file for complete search history.

(56) References Cited

U.S. PATENT DOCUMENTS

| 5,479,601 | A |   | 12/1995 | Matheny et al. |
|---|---|---|---|---|
| 5,481,710 | A | * | 1/1996 | Keane et al. .................... 719/320 |
| 5,537,526 | A | * | 7/1996 | Anderson et al. .............. 715/209 |
| 5,983,242 | A | * | 11/1999 | Brown et al. ........................... 1/1 |
| 6,185,577 | B1 |   | 2/2001 | Nainani et al. |
| 6,192,378 | B1 |   | 2/2001 | Abrams et al. |
| 6,527,812 | B1 |   | 3/2003 | Bradstreet |
| 6,567,798 | B1 |   | 5/2003 | Hollberg et al. |
| 6,728,347 | B1 |   | 4/2004 | Huschmann et al. |
| 6,728,847 | B1 |   | 4/2004 | Qin et al. |
| 6,907,428 | B2 |   | 6/2005 | Fitzpatrick et al. |
| 7,207,034 | B2 |   | 4/2007 | Burke et al. |
| 7,945,536 | B2 |   | 5/2011 | Bao et al. |
| 2002/0156798 | A1 | * | 10/2002 | Larue et al. .................... 707/201 |

(Continued)

FOREIGN PATENT DOCUMENTS

CN          1859379 A      11/2006

OTHER PUBLICATIONS

Tidwell, "Multi-Level Undo," <http://designinginterfaces.com/Multi-Level_Undo>, 2005.*

(Continued)

*Primary Examiner* — Cheyne D Ly
(74) *Attorney, Agent, or Firm* — David Andrews; Thomas Wong; Micky Minhas

(57) ABSTRACT

Architecture for multi-level undo on a client in grid-based applications. The architecture is a control driven cascading changes system where change tracking works seamlessly in asynchronous (and synchronous) scenarios. A client application is associated with a grid object and, instantiates and configures the grid object. The application can initiate a change to data in the grid and/or the user can edit the data in the grid directly. A result of the change is a notification to the application, the notification including an order key. The application consumes the notification and can then append new changes based on synchronous or asynchronous computations by calling an update function using the order key. The application uses the key to attach further updates which are properly collected together for undo/redo.

16 Claims, 14 Drawing Sheets

(56) References Cited

U.S. PATENT DOCUMENTS

| | | | |
|---|---|---|---|
| 2003/0120690 A1* | 6/2003 | Schaeffer et al. | 707/500 |
| 2003/0182463 A1 | 9/2003 | Valk | |
| 2003/0212740 A1* | 11/2003 | Berrigan et al. | 709/203 |
| 2003/0212987 A1* | 11/2003 | Demuth et al. | 717/130 |
| 2004/0103342 A1* | 5/2004 | Moser et al. | 714/6 |
| 2004/0268187 A1* | 12/2004 | Burke et al. | 714/40 |
| 2006/0085426 A1* | 4/2006 | Verma et al. | 707/10 |
| 2006/0085486 A1 | 4/2006 | Thanu et al. | |
| 2006/0136510 A1 | 6/2006 | Voronov et al. | |
| 2006/0143239 A1* | 6/2006 | Battat et al. | 707/201 |
| 2006/0155747 A1 | 7/2006 | Olivieri et al. | |
| 2006/0218159 A1 | 9/2006 | Murphy et al. | |
| 2006/0271601 A1 | 11/2006 | Fatula, Jr. et al. | |
| 2008/0147751 A1 | 6/2008 | Bao et al. | |
| 2008/0178073 A1* | 7/2008 | Gao et al. | 715/243 |

OTHER PUBLICATIONS

Tidwell, "Multi-Level Undo," <http://designinginterfaces.com/Multi-Level_Undo>, excerpted from Tidwell, "Designing Interfaces: Patterns for Effective Interaction Design," O'Reilly Media, 2005.*

"Undo and Redo", 2007, Apple Inc.

"Multi-Level Undo", retrieved at <<http://designinginterfaces.com/Multi-Level_Undo>>.

"Undo Management", Copyright 1998, Integrated Computer Solutions, Inc.

"International Search Report", Mailed Aug. 17, 2009, Application No. PCT/US2008/087925, Filed Date Dec. 22, 2008, pp. 1-12.

Search Report received for European Patent Application No. 08869540.8, mailed Sep. 20, 2012. 6 pgs.

* cited by examiner

*400

402

| CHANGE NOTIFICATION ||
|---|---|
| CHANGE KEY: A ||
| ROW: 2 | ROW: 2 |
| FIELD: DURATION | FIELD: END DATE |
| NEW VALUE: 5 DAYS | NEW VALUE: 5/25 |

404

| CHANGE NOTIFICATION ||
|---|---|
| CHANGE KEY: B ||
| ROW: 3 | ROW: 3 |
| FIELD: DURATION | FIELD: END DATE |
| NEW VALUE: 7 DAYS | NEW VALUE: 5/27 |

*FIG. 4*

ASYNCHRONOUS MULTI-LEVEL UNDO SUPPORT IN JAVASCRIPT GRID

BACKGROUND

One of the main differentiators between desktop client applications and "thin" web applications is the richness of the editing experience. Traditionally, web applications transact data with the server according to individual post-backs, which commit data to the server as the user navigates the application. Undoing a user action is oftentimes not possible once a user navigates away from a webpage. Conversely, a user can interact with a client application more fluidly, only saving data when the user is ready to do so. Moreover, if the user makes an editing mistake while working in the client application, the user can select "undo" one or more times to revert the changes with no effect to the saved file.

Many software technologies now require employees to interact with data on enterprise servers through web-type applications. Consider the editing of structured task data (e.g., adding/deleting tasks, assigning resources, changing scheduled data, etc.) commonly found in project servers, for example, but via a webpage. Without multi-level undo capability, this experience can be perilous as users are not allowed to undo actions. The user can perform frequent saves, but saving such datasets to the server is a slow process. Thus, the effective edit performance decreases proportionately with the user's comfort for typing complex data into a webpage.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed multi-level undo architecture is a control driven cascading changes system where change tracking works seamlessly in asynchronous (and synchronous) scenarios. Moreover, the undo transcends save actions, understands the difference between implicit and explicit changes, and handles these changes accordingly to provide context for the undo.

The client application is associated with a grid object that presents the data of the application as a tabular representation, thereby supporting editing and visualization. The application, in part, instantiates and configures the grid object. The application can programmatically initiate a change to data in the grid and/or the user can edit the data in the grid directly. A result of the change is a notification to the application, the notification including an order key. The application consumes the notification and can then append new changes based on synchronous or asynchronous computations (e.g., scheduling) by calling an update function using the order key. The application can use the key at any point in the future to attach further updates to the change. The updates are properly collected together for undo/redo.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

BRIEF DESCRIPTION OF THE DRAWINGS

FIG. 4 illustrates the final data updates based on the use of change keys to address asynchronous out-of-order change processing.

DETAILED DESCRIPTION

Figure 1:
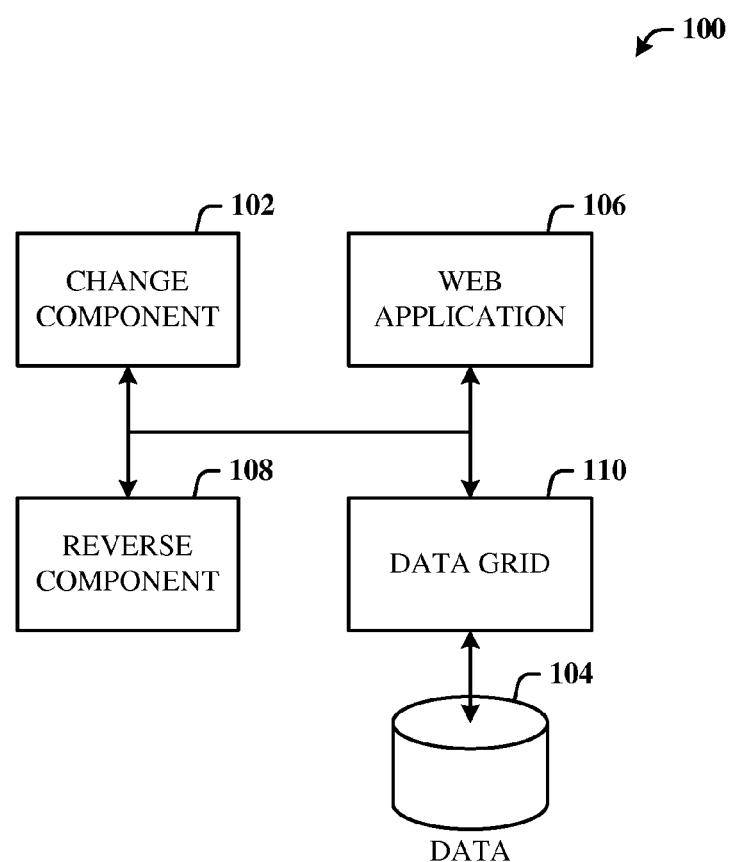
FIG. 1 illustrates computer-implemented undo system.

The disclosed architecture bridges a major gap in the editing experience of "thin" web applications by supporting multi-level undo on the client in grid-based applications. This feature is useful to a number of online editing experiences as well. For example, multi-level undo allows the user to feel more comfortable about editing more data at once, and increases the user perception of the positive performance of the application. Moreover, online versions of applications also can benefit such that multiple changes within a record may be undone and redone so that a user has total control over editing.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented undo system 100. The system 100 includes a change component 102 for tracking asynchronous changes to data 104 via a web application 106. The system 100 further includes a reverse component 108 for performing reverse operations (e.g., undo, redo) on the data changes to the data 104 to previous states. The changes to the data 104 can be made via a data grid 110. The changes to the data 104 can be made manually or programmatically via the grid 110.

The application 106 instantiates and configures the grid 110. The grid 110 is a tabular representation of data that is stored in the application 106, supporting editing and visualization. A change is the before and after versions of a cell's data, plus the action that was required to cause the cell value to change.

In one embodiment, the web application 106 is a browser application via which changes are made to a web page hosted by a server. The user can then exercise multi-level undo/redo reverse operations for changes made to the webpage document. In another implementation, the web application 106 is a browser that allows a user to interact with local data, rather than network data, and exercise reverse operations such as multi-level undo/redo.

Figure 2:
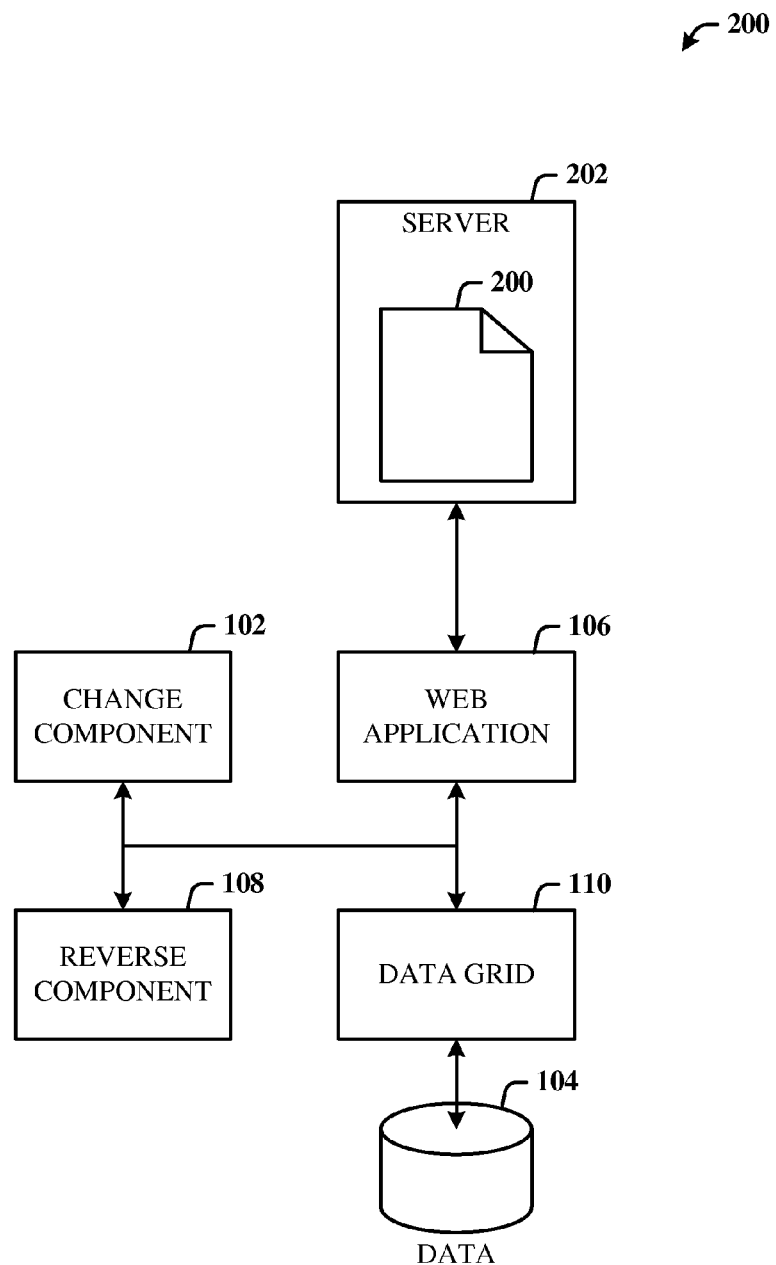
FIG. 2 illustrates an implementation of a client-server system that provides multi-level data change reverse operations.

FIG. 2 illustrates an implementation of a client-server system 200 that provides multi-level data change reverse operations. The system 200 shows the system 100 of FIG. 1, to wit, the change component 102 for tracking asynchronous changes to the data 104 via the web application 106, and the reverse component 108 for performing reverse operations (e.g., undo, redo) on the data changes to previous states. The data changes are made manually and/or programmatically via the data grid 110. Here, the data changes are applied to a web document (e.g., webpage) 200 of a web server 202. As edits are passed into the grid 110, change notifications are sent to the server 202 via the application 106 for asynchronous validation. Once validated, the changes are sent back to the grid 110 via the application 106 as updates to the data 104.

Figure 3:
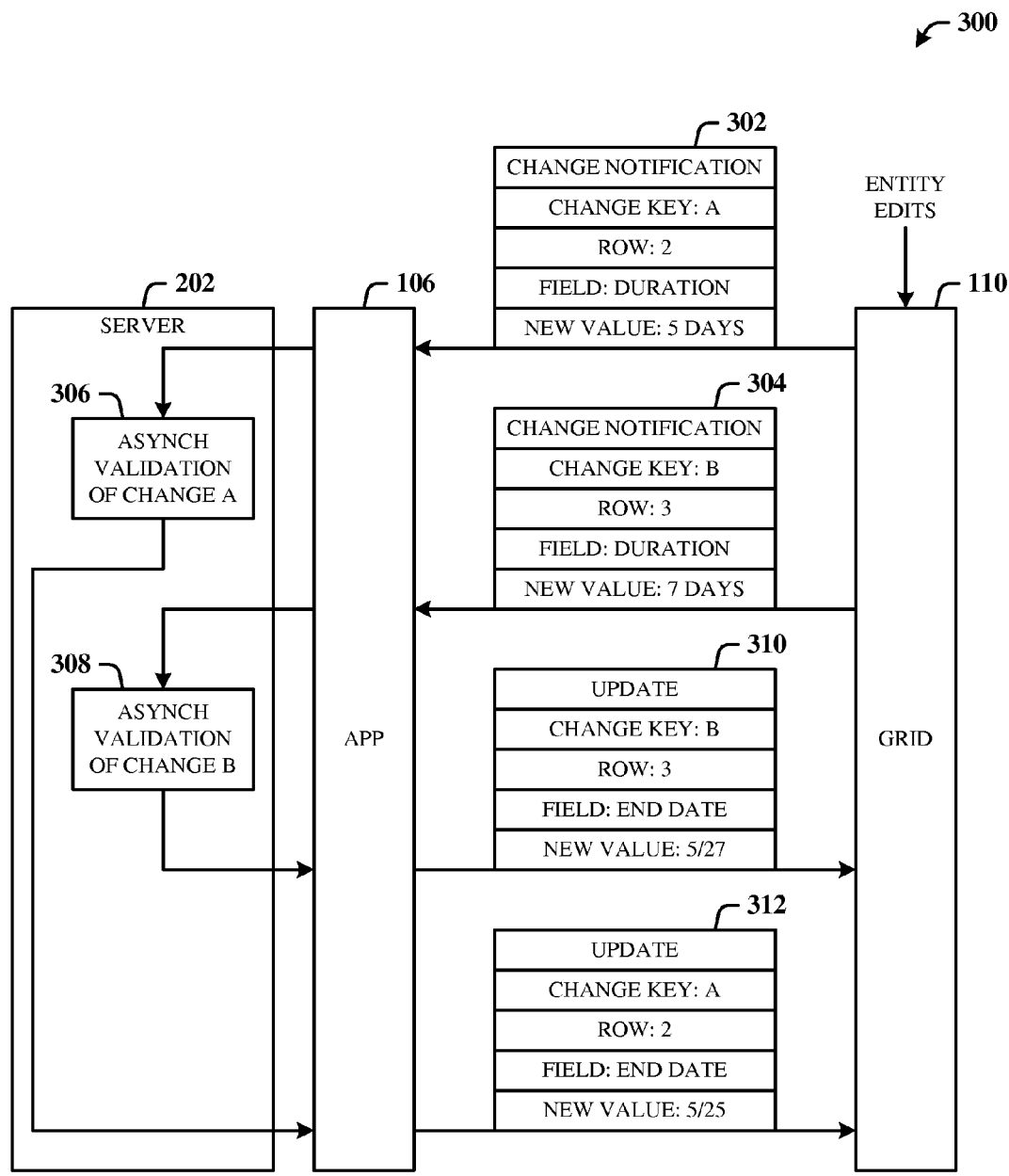
FIG. 3 illustrates an example of asynchronous undo/redo operations on data.

FIG. 3 illustrates an example 300 of asynchronous undo/redo operations on data. An asynchronous change is a change that requires any number of asynchronous validations or augmentations. When an entity makes changes to the grid data, the result of this change is a notification to the application 106. Contained within this notification is an order (or change) key. The application 106 consumes the notification and then can append new changes based on some synchronous or asynchronous computations (e.g., scheduling) by calling an update function with that order key. The application 106 is free to use the order key at any point in the future to attach further updates to this change. These updates are properly collected together for undo/redo.

Here, two changes, denoted as A and B, are entered into the grid 110 that require asynchronous validation. When the edits are made, the changes are captured in order by the grid 110. Each change is tagged with an order key. For example, change A is tagged with an order key A (also denoted change key A) and the second change B (later in time than change A) is denoted with a change key B. When a data change is made, the grid 110 detects this and sends a notification to the application 106 (e.g., a browser), which the application 106 then sends the notification to the server 202 for validation. The validation process at the server 202 can occur out-of-order, or once the validation has completed, the server can send the previously ordered validation out-of-order. Thus, the order keys facilitate ordering the changes at the grid 110.

In this example, a first change notification request 302 is sent from the grid 110 to the application 106 to account for the data change A, made in a second row to a column having a field labeled Duration, and a new value of the duration set to five days. In a subsequent data edit, the grid 110 sends a second change notification request 304 to the application 106 to account for the data change B, made in a third row to a column having a field labeled Duration, and a new value of the duration set to seven days. The change notification requests (302 and 304) are sent to the application 106 in order (e.g., change A before change B). The application 106 then forwards the notification requests (302 and 304) to the server 202, the server 202 validates the change requests (302 and 304) asynchronously, and returns the validations back to the application 106.

Here, the server 202 begins a first validation process 306 for the first change notification request 302. Next, the server 202 receives and begins a second validation process 308 for the second change notification request 304. The server 202 completes the second validation process 308 before the first validation process 306. Thus, a second update response 310 is sent from the server 202 through the application 106 to the grid 110 for updating the associated data. The second update response 310 includes the order key B that signifies the order in which the data change was made relative to the first data change A. The second update response 310 also includes that the change was made in the third row, at a field labeled End Date, and the new value for End Date of May/27. This corresponds to the new value of seven days in the second change notification request 304.

The server 202 then completes the first validation process 306 and sends a first update response 312 through the application 106 to the grid 110 for updating the associated data. The first update response 312 includes the order key A that signifies the order in which the data change was made relative to the second data change B. The first update response 312 also includes that the change was made in the second row, at a field labeled End Date, and the new value for End Date of May/25. This corresponds to the new value of five days in the first change notification request 302. Thus, the changes come back from validation out of order (change B before change A).

FIG. 4 illustrates the final data updates based on the use of change keys to address asynchronous out-of-order change processing. The results 400 of the requests for the data changes which have occurred since the last save operation are shown. When returned from the server 202, the results are placed and stored in the logical order that the change (or order) keys dictate (change B after change A), rather than the order in which the events actually occurred (change A after change B). Thus, the changes 402 related to change A are stored together and denoted as occurring before change B. Similarly, the changes 404 related to change B are stored together and denoted as occurring after change A.

The undo and redo reverse operations are also handled in this way. Thus, if a user were to select undo, both changes (Duration and End Date) associated with change B would be undone, since that is the last change the user made, as indicated by change key B, even though the update to change A was the last event the grid encountered.

An entity (e.g., a user or system) interacts with the grid to make change to data in the grid, either explicitly or implicitly. An explicit change is a change made to the grid that directly affects data (e.g., changing a start date on a task). An implicit change is a change that is made to the grid that has no effect on the data (e.g., resizing a column).

Figure 5:
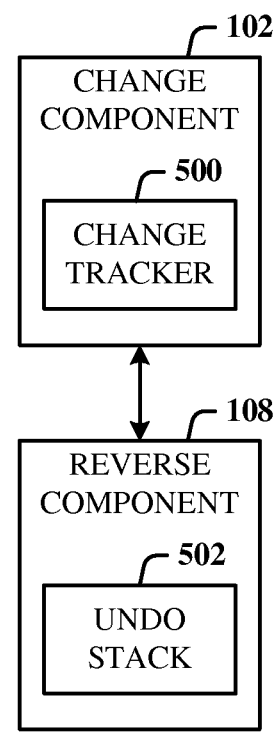
FIG. 5 illustrates a change tracker as part of the change component and an undo stack as part of the reverse component.

FIG. 5 illustrates a change tracker 500 as part of the change component 102 and an undo stack 502 as part of the reverse component 108. As an entity makes changes to grid data, the type of each change is noted, and functions to execute and undo are placed on the undo stack 502. The undo stack 502 is a data structure that stores an ordered history of the last set of actions. When an undo event happens, operations are removed from the undo stack 502 and reverted until the first explicit change is encountered. The first explicit change is the last action reverted. At this point, the undo operation concludes. Subsequent undo operations are handled in the same manner; an undo command will revert all implicit actions before the next explicit action, and then revert the explicit action.

The effect of this system is that after an undo operation, the visual state of the grid is restored before the undone action. All explicit changes are stored in a separate structure (the change tracker 500) from the undo stack 502. This change tracker 500 can be exported as a collection of cell-level changes.

The undo stack 502 and the change tracker 500 are independent structures. When a change occurs, that change is pushed onto the undo stack 502, and an entry for that change is made in the change tracker 500 if the change was explicit. If the change is implicit, the change is not logged in the change tracker 500.

When an undo event occurs, the change is removed from the undo stack 502 and the change tracker 500, and the new value is noted in the change tracker 500. If the change existed in the change tracker 500, that change is removed. If the change does not exist in the change tracker 500, the action to revert the change (which itself is a change) is added to a change log. When a save operation occurs the changes are read from the change tracker 500, committed to the datasource, and the change tracker 500 is cleared.

The effect of this system is that an entity can undo actions that occurred prior to the save event because the information necessary to undo a change is stored in the undo stack 502. Similarly, the change tracker 500 can function in the absence of the undo stack 502.

Figure 6:
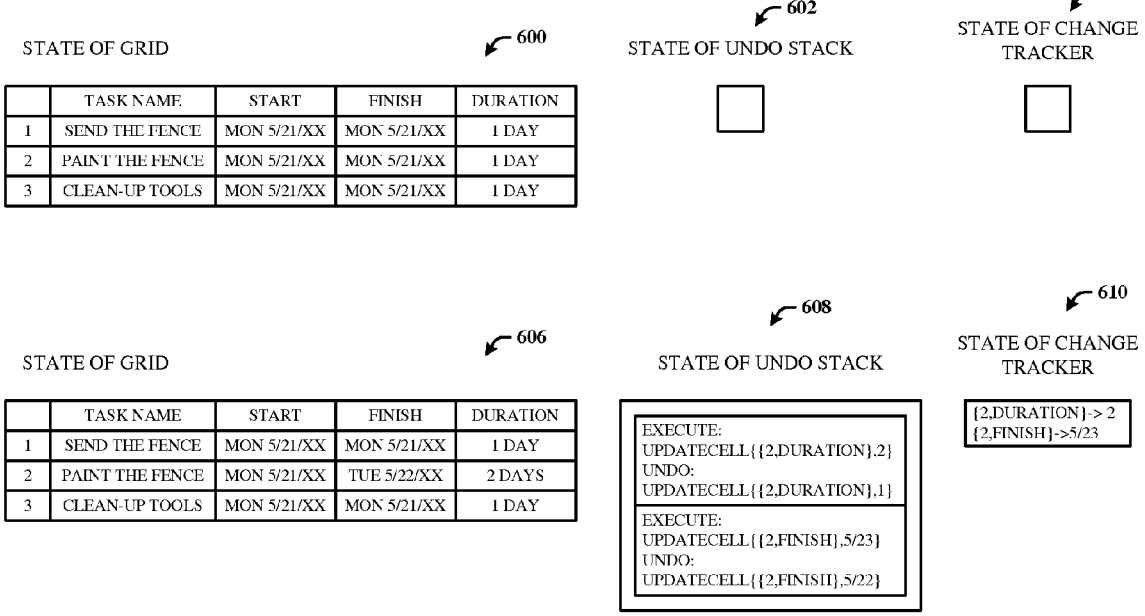
FIG. 6 illustrates the initial grid state of data in the grid, stack state of the undo stack, and tracker state of the change tracker.

FIGS. 6-9 illustrate a series of diagrams for exemplifying changes that occur in the state of grid data, the undo stack, and the change tracker. FIG. 6 shows the initial grid state 600 of data in the grid, stack state 602 of the undo stack, and tracker state 604 of the change tracker. The changes will occur in rows two and three of the grid data.

The entity then makes an explicit change by deciding that painting the fence should take two days instead of one day. The change grid state 606 includes a change in the second row in the Duration column to two days. In the case of a project as part of a project management application, for example, a change in duration causes a change in the end date, also called Finish (a cascading change). A cascading transaction is created encompassing both changes. Thus, the field information in the second row in the Finish column changes from Mon May/21/xx to Tue May/22/xx, as indicated in changed grid state 606.

Figure 7:
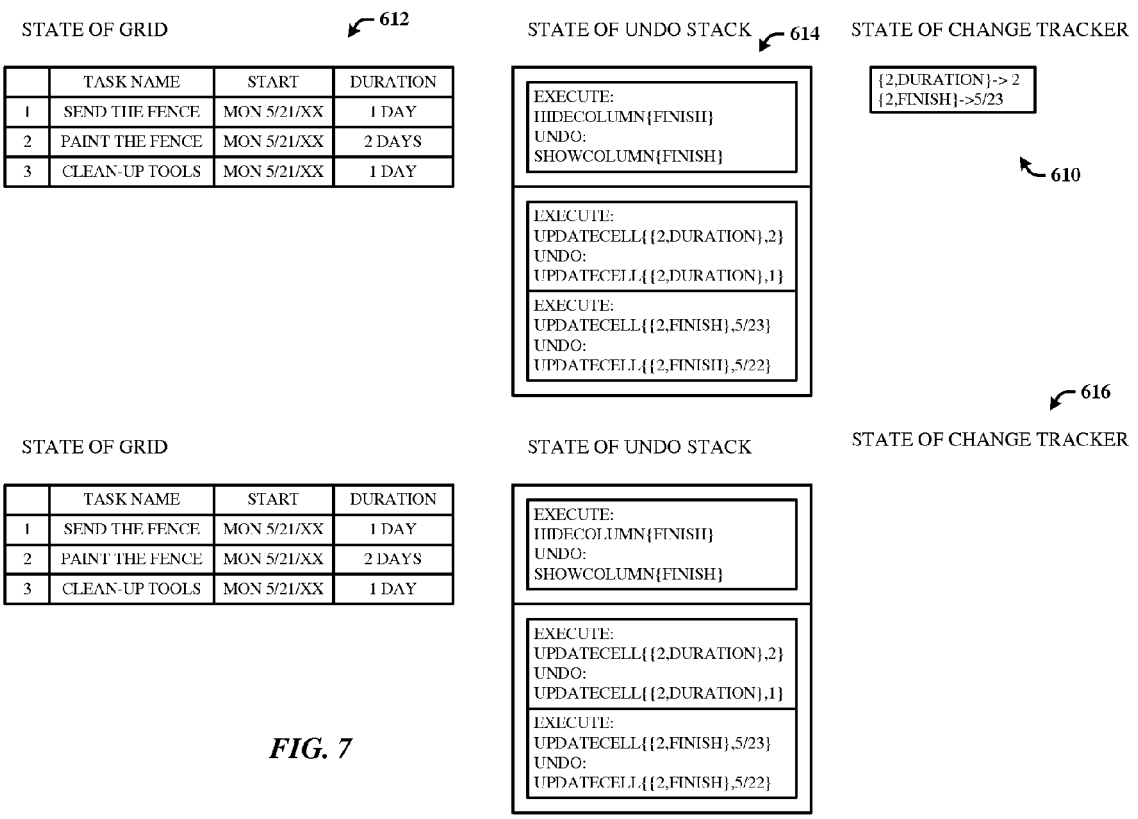
FIG. 7 illustrates an implicit change and the effects on the stack state and tracker state.

These Duration and Finish changes are pushed onto the undo stack as indicated in the stack state 608. Additionally, the tracker state 610 reflects the changes. FIG. 7 shows an implicit change and the effects on the stack state and tracker state. Here, the entity hides the Finish column thereby changing to the grid state 612, which pushes the change onto the undo stack changing to the stack state 614, but does not change the tracker state 610 of the change tracker. The entity saves the project, which causes the tracker state 610 in the change tracker to be cleared to stack state 616, as the grid's data is now consistent with the server data.

Figure 8:
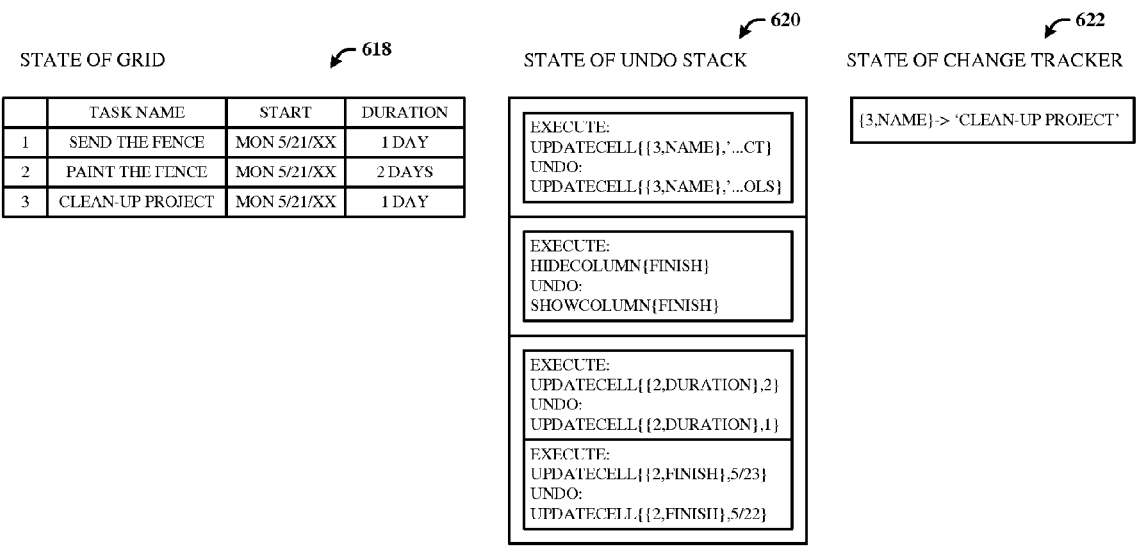
FIG. 8 illustrates a change in the task name of the grid data and the effects on the undo stack and change tracker.

FIG. 8 illustrates a change in the task name of the grid data and the effects on the undo stack and change tracker. The entity changes the grid state 618 based on a change in the task name in row three from 'Clean-up tools' to 'Clean-up project'. The stack state 620 reflects the change pushed onto the stack, and the tracker reflects tracker state 622.

Figure 9:
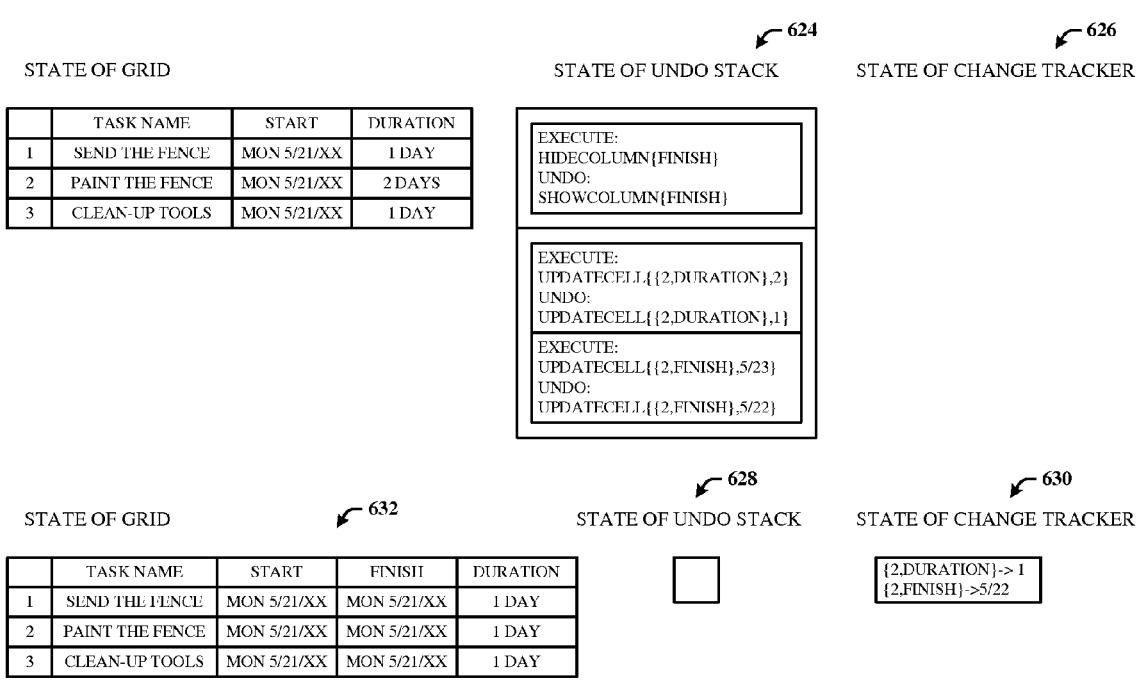
FIG. 9 illustrates execution of an undo operation.

FIG. 9 illustrates execution of an undo operation. The undo reverts the last explicit change by popping the change from the undo stack and the change tracker, as shown in the stack state 622 and tracker state 626 (no change from before). The entity then executes undo once more, which reverts both the implicit change and the remaining explicit change. This cascading effect removes the change from the undo stack to a stack state 628, adds an inverse change to the change tracker to a tracker state 630, and changes the grid state back to grid state 632, which is the same as grid state 600 of FIG. 6.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
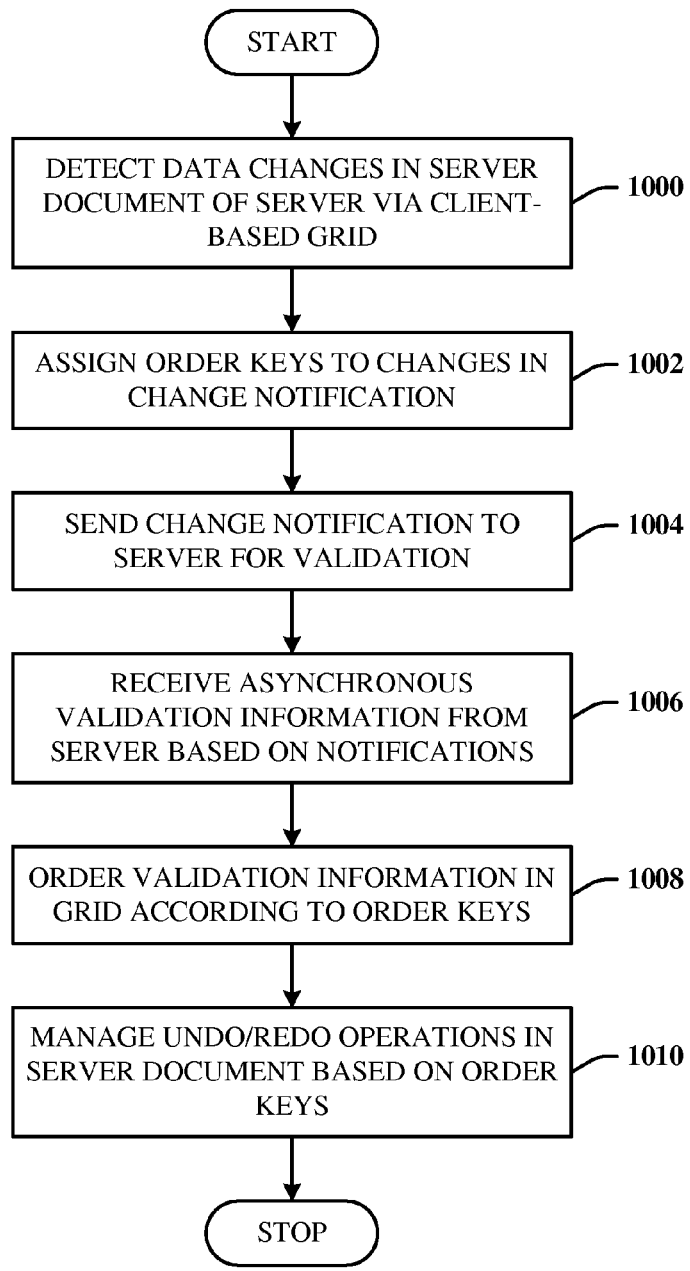
FIG. 10 illustrates a computer-implemented method of providing reverse operations in data.

FIG. 10 illustrates a computer-implemented method of providing reverse operations in data. At 1000, data changes in a server document of a server are detected via a client-based grid. At 1002, order keys are assigned to the changes in a change notification. At 1004, the change notifications are sent to the server for validation. At 1006, asynchronous validation information is received from the server based on the notifications. At 1008, the validation information is ordered in the grid according to the order keys. At 1010, undo/redo operations in the server document are managed based on the order keys.

Figure 11:
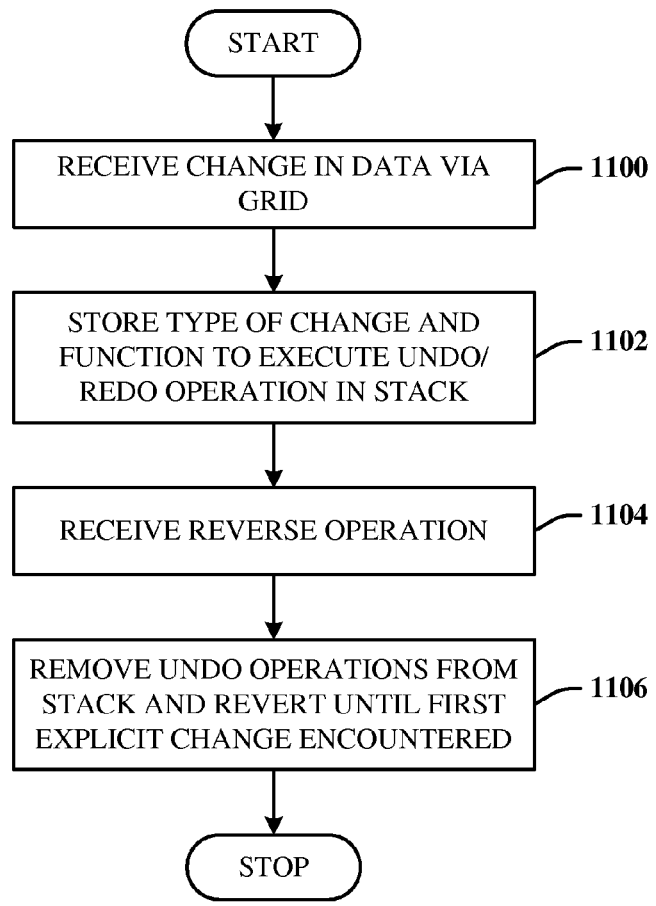
FIG. 11 illustrates a method of processing explicit/implicit changes.

FIG. 11 illustrates a method of processing explicit/implicit changes. At 1100, a change in data is received via a grid. At 1102, the type of change and a function to undo/redo the change are stored in an undo stack. At 1104, a reverse operation (e.g., redo, undo) is received. At 1106, the undo operations are removed from the stack and reverted until the first explicit change is encountered (which is the last action reverted).

Figure 12:
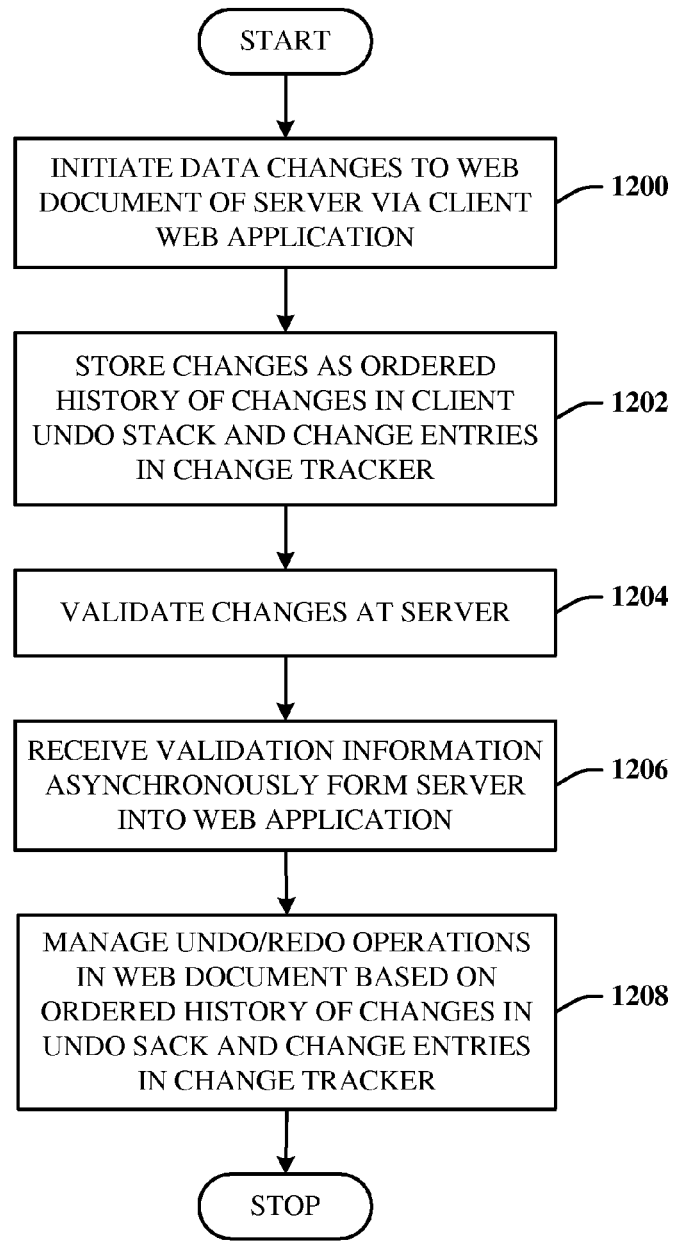
FIG. 12 illustrates

FIG. 12 illustrates a computer-implemented method of providing reverse operations in data. At 1200, data changes are initiated to a web document of a server via a client web application. At 1202, the changes are stored as an ordered history of the changes in a client undo stack and change entries in a client change tracker. At 1204, the changes are validated at the server. At 1206, validation information is received asynchronously from the server into the web application. At 1208, undo/redo operations in the web document are managed at the client based on the ordered history of the changes in the undo stack and the change entries in the change tracker.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
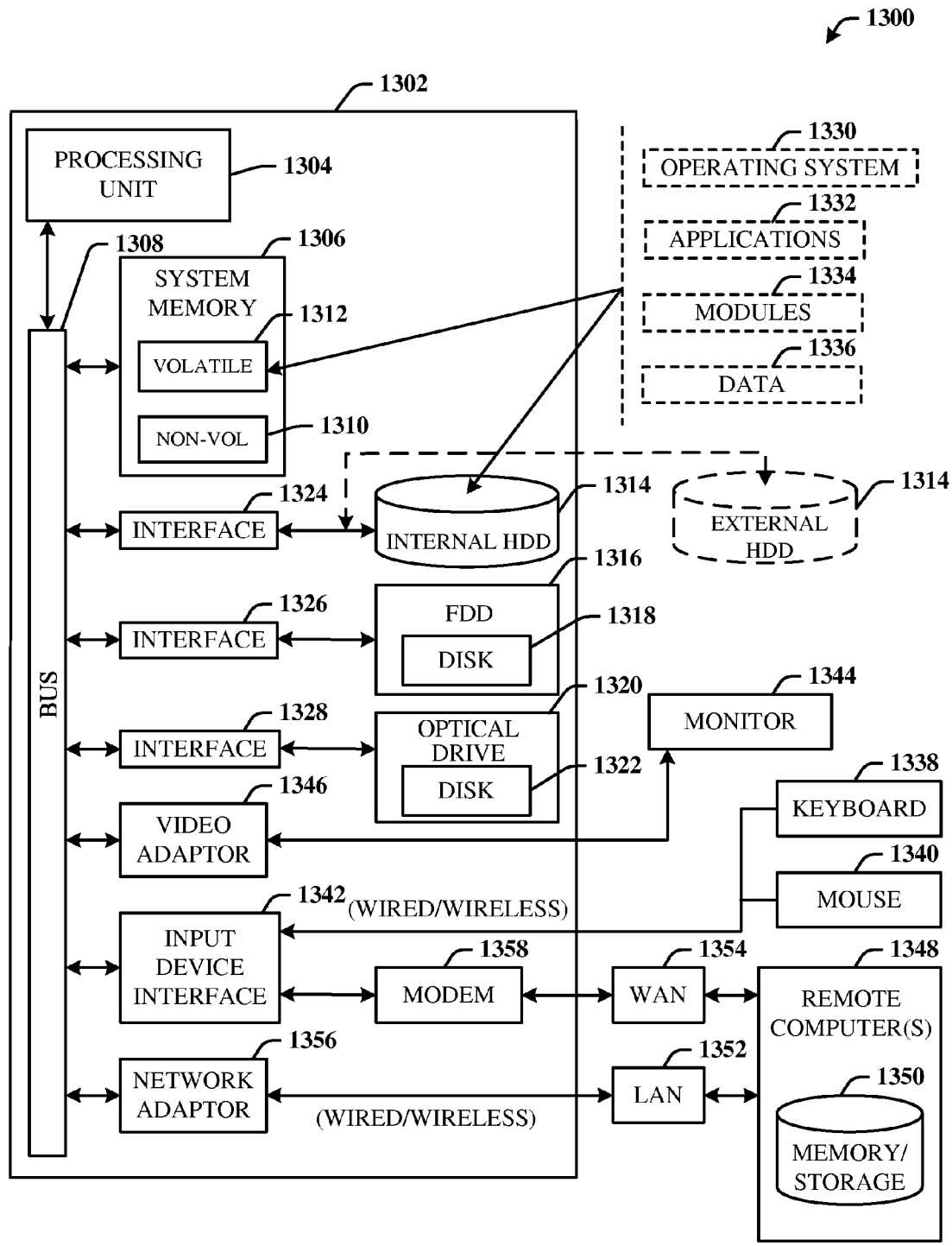
FIG. 13 illustrates a block diagram of a computing system operable to execute multi-level undo in accordance with the disclosed architecture.

Referring now to FIG. 13, there is illustrated a block diagram of a computing system 1300 operable to execute multi-level undo in accordance with the disclosed architecture. In order to provide additional context for various aspects thereof, FIG. 13 and the following discussion are intended to provide a brief, general description of a suitable computing system 1300 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302 having a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 can include non-volatile memory (NON-VOL) 1310 and/or volatile memory 1312 (e.g., random access memory (RAM)). A basic input/output system (BIOS) can be stored in the non-volatile memory 1310 (e.g., ROM, EPROM, EEPROM, etc.), which BIOS stores the basic routines that help to transfer information between elements within the computer 1302, such as during start-up. The volatile memory 1312 can also include a high-speed RAM such as static RAM for caching data.

The computer 1302 further includes an internal hard disk drive (HDD) 1314 (e.g., EIDE, SATA), which internal HDD 1314 may also be configured for external use in a suitable chassis, a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as a DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1312, including an operating system 1330, one or more application programs 1332, other program modules 1334, and program data 1336. The one or more application programs 1332, other program modules 1334, and program data 1336 can include the change component 102, data 104, web application 106, reverse component 108, data grid 110, change notifications (302 and 304), update responses (310 and 312), change tracker 500, undo stack 502, grid states (600, 606, 612, 618, and 632), stack state (602, 608, 614, 620, 624 and 628), and tracker state (604, 610, 616, 622, 626 and 630), for example.

All or portions of the operating system, applications, modules, and/or data can also be cached in the volatile memory 1312. It is to be appreciated that the disclosed architecture can be implemented with various commercially available operating systems or combinations of operating systems.

A user can enter commands and information into the computer 1302 through one or more wire/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, etc.

A monitor 1344 or other type of display device is also connected to the system bus 1308 via an interface, such as a video adaptor 1346. In addition to the monitor 1344, a computer typically includes other peripheral output devices (not shown), such as speakers, printers, etc.

The computer 1302 may operate in a networked environment using logical connections via wire and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, is connected to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 14:
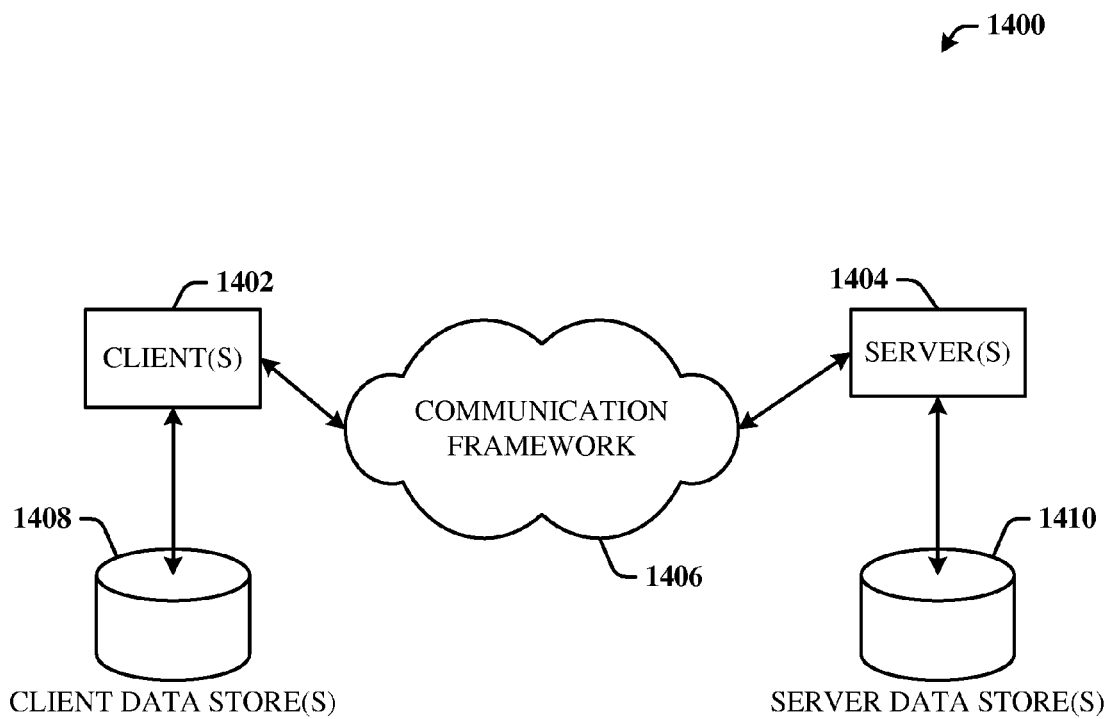
FIG. 14 illustrates a schematic block diagram of an exemplary client-server computing environment for multi-level undo processing.

Referring now to FIG. 14, there is illustrated a schematic block diagram of an exemplary client-server computing environment 1400 for multi-level undo processing. The environment 1400 includes one or more client(s) 1402. The client(s) 1402 can be hardware and/or software (e.g., threads, processes, computing devices). The client(s) 1402 can house cookie(s) and/or associated contextual information, for example.

The environment 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The environment 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The client(s) 1402 can include the web application 106 and client data store(s) 1408 can include the data 104. The server(s) 1404 can include the server 202 and asynchronous validation processes (306 and 308), and the server data store(s) 1410 can include the document 200.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented undo, comprising:
    a change component for tracking asynchronous data changes to data via a web application, where the asynchronous data changes are changes that require asynchronous validations or augmentations and include explicit changes that directly affect data and implicit changes that do not affect data;
    a reverse component for performing multi-level undo/redo reverse operations on the asynchronous data changes, the reverse component comprising an undo stack storing explicit changes and implicit changes and a change tracker data structure storing entries for the explicit changes, wherein an undo command removes entries from the change tracker data structure for explicit changes, and removes and reverts changes from the undo stack until an explicit change is reverted;
    a data grid for providing a tabular representation of the data stored in the web application, comprising cells for recording the asynchronous data changes, to support editing and visualization of the asynchronous data changes, the data grid sends a notification to the web application associated with the asynchronous data changes wherein the notification includes an order key that facilitates ordering of the changes at the grid relative to other data changes;
    a processor that executes computer-executable instructions associated with at least the change component and reverse component.

2. The system of claim 1, wherein the asynchronous data changes are associated with a webpage.

3. The system of claim 1, wherein the web application is a browser application.

4. The system of claim 1, wherein the data grid is a client-based data grid, and wherein the asynchronous data changes include before and after versions of the data in a cell, and an action to cause the cell data to change.

5. The system of claim 4, wherein the asynchronous data changes are made manually or programmatically via the grid.

6. The system of claim 1, wherein the reverse operations restore the data to a state that existed according to at least two previous changes.

7. The system of claim 1, wherein the processor sends the notification to the data grid via the web application.

8. The system of claim 1, wherein the undo stack and the change tracker data structure are client-based.

9. A computer-implemented method of providing reverse operations in data, comprising acts of:
  detecting asynchronous data changes in a server document of a web-based application on a server via a client-based data grid including cells in a tabular representation for recording the asynchronous data changes, to support editing and visualization of the asynchronous data changes, wherein the asynchronous data changes include explicit changes that directly affect data and implicit changes that do not affect data;
  assigning order keys to the asynchronous data changes in a change notification, where the order keys signify relative ordering of the asynchronous data changes to be made at the data grid;
  sending the change notifications from the data grid to the web-based application and then to the server for asynchronous validation;
  receiving asynchronous validation information from the server based on the notifications;
  ordering the asynchronous validation information in the data grid according to the order keys;
  managing undo/redo operations in the server document based on the order keys, wherein an undo stack stores explicit changes and implicit changes and a change tracker data structure stores entries for the explicit changes, wherein an undo command removes entries from the change tracker data structure for explicit changes, and removes and reverts changes from the undo stack until an explicit change is reverted; and
  utilizing a processor that executes instructions stored in memory to perform at least the acts of detecting, assigning, sending, receiving, ordering, and managing.

10. The method of claim 9, further comprising cascading changes through an undo stack and the change tracker data structure based on the changes in the data grid.

11. A computer-implemented method of providing reverse operations in data, comprising acts of:
  initiating data changes to a web document of a server via a client web application, wherein the data changes include explicit changes that directly affect data and implicit changes that do not affect data;
  storing the changes as an ordered history of the changes in a client undo stack and storing change entries in a separate client change tracker data structure for explicit changes, the undo stack storing explicit changes and implicit changes;
  validating the changes at the server;
  receiving validation information asynchronously from the server into the web application;
  managing undo/redo operations in the web document, based on the ordered history of the changes, in the undo stack and the change entries in the change tracker, wherein an undo command removes entries from the change tracker data structure for explicit changes, and removes and reverts changes from the undo stack until an explicit change is reverted; and
  utilizing a processor that executes instructions stored in memory to perform at least the acts of initiating, storing, validating, receiving, and managing.

12. The method of claim 11, further comprising exposing the data changes and visualization of the data changes via a client data grid.

13. The method of claim 11, further comprising undoing changes in the web document that have occurred before a save operation performed in the web application.

14. The method of claim 11, further comprising, in response to a save operation, reading changes from the change tracker, committing the changes to a datasource, and clearing the change tracker.

15. The method of claim 11, wherein the ordered history of the changes is based on a change key assigned to each change.

16. The method of claim 11, further comprising exporting changes as a collection of cell-level changes.

* * * * *